(12) United States Patent
Visco et al.

(10) Patent No.: US 6,846,511 B2
(45) Date of Patent: Jan. 25, 2005

(54) METHOD OF MAKING A LAYERED COMPOSITE ELECTRODE/ELECTROLYTE

(75) Inventors: Steven J. Visco, Berkeley, CA (US); Craig P. Jacobson, El Cerrito, CA (US); Lutgard C. DeJonghe, Lafayette, CA (US)

(73) Assignee: The Regents of the University of California, Berkeley, CA (US)

( * ) Notice: Subject to any disclaimer, the term of this patent is extended or adjusted under 35 U.S.C. 154(b) by 0 days.

(21) Appl. No.: 10/724,558

(22) Filed: Nov. 26, 2003

(65) Prior Publication Data

US 2004/0231143 A1 Nov. 25, 2004

Related U.S. Application Data

(62) Division of application No. 09/626,022, filed on Jul. 27, 2000, now Pat. No. 6,682,842
(60) Provisional application No. 60/146,767, filed on Jul. 31, 1999.

(51) Int. Cl.[7] .............................. B05D 5/12; H01M 6/00
(52) U.S. Cl. .................... 427/115; 427/123; 427/126.1; 427/126.3; 427/205; 427/383.3; 29/623.5
(58) Field of Search ................................. 427/115, 123, 427/126.1, 126.3, 205, 383.3; 429/33, 41, 45; 29/623.5

(56) References Cited

U.S. PATENT DOCUMENTS

| 4,720,335 A | 1/1988 | Fukushima et al. |
| 5,240,480 A | 8/1993 | Thorogood et al. |

(List continued on next page.)

FOREIGN PATENT DOCUMENTS

| GB | 1 383 343 A | 2/1974 |
| JP | 56-2549 A | 1/1981 |
| JP | 7-6768 A | 1/1995 |
| WO | WO 97 00734 A | 1/1997 |

OTHER PUBLICATIONS

Christiansen, "Solid Oxide Fuel Cell", Aug. 9, 2001, U.S. Patent Application Publication, Publication No. US 2001/0012576 A1.

(List continued on next page.)

Primary Examiner—Brian K. Talbot
(74) Attorney, Agent, or Firm—Beyer Weaver & Thomas LLP

(57) ABSTRACT

An electrode/electrolyte structure is prepared by a plurality of methods. An unsintered (possibly bisque fired) moderately catalytic electronically-conductive or homogeneous mixed ionic electronic conductive electrode material is deposited on a layer composed of a sintered or unsintered ionically-conductive electrolyte material prior to being sintered. A layer of particulate electrode material is deposited on an unsintered ("green") layer of electrolyte material and the electrode and electrolyte layers are sintered simultaneously, sometimes referred to as "co-firing," under conditions suitable to fully densify the electrolyte while the electrode retains porosity. Or, the layer of particulate electrode material is deposited on a previously sintered layer of electrolyte, and then sintered. Subsequently, a catalytic material is added to the electrode structure by infiltration of an electrolcatalyst precursor (e.g., a metal salt such as a transition metal nitrate). This may be followed by low temperature firing to convert the precursor to catalyst. The invention allows for an electrode with high electronic conductivity and sufficient catalytic activity to achieve high power density in an ionic (electrochemical) device such as fuel cells and electrolytic gas separation systems.

30 Claims, 3 Drawing Sheets

U.S. PATENT DOCUMENTS

| | | | |
|---|---|---|---|
| 5,306,411 A | | 4/1994 | Mazanec et al. |
| 5,328,779 A | | 7/1994 | Tannenberger et al. |
| 5,366,770 A | | 11/1994 | Wang |
| 5,670,270 A | * | 9/1997 | Wallin .......................... 429/33 |
| 5,932,368 A | | 8/1999 | Batawi et al. |
| 5,938,822 A | * | 8/1999 | Chen et al. .................... 96/11 |
| 5,993,986 A | * | 11/1999 | Wallin et al. ................. 429/32 |
| 6,017,647 A | | 1/2000 | Wallin |
| 6,344,291 B1 | * | 2/2002 | Hitomi ......................... 429/42 |
| 6,358,567 B2 | | 3/2002 | Pham et al. |
| 6,368,383 B1 | | 4/2002 | Virkar et al. |
| 6,420,064 B1 | * | 7/2002 | Ghosh et al. ................. 429/40 |
| 6,576,363 B1 | * | 6/2003 | Hitomi ......................... 429/42 |
| 6,682,842 B1 | * | 1/2004 | Visco et al. .................. 429/33 |

OTHER PUBLICATIONS

Seabaugh, et al., Low–Cost Fabrication Processes for Solid Oxide Fuel Cells, NexTech exhibited at the Fuel Cells 2000 Conference in Portland Oct. 30, 2000–Nov. 2, 2000, NexTech Materials, Ltd.

Fujii, K., et al., "Manufacturing and Characterization of Metallic System Support Tube for Solid Oxide Fuel Cells", Bullentin of the Electrotechnical Laboratory, vol. 62, No. 1–2, 1998, pp. 1319.

Momma, et al., "High Potential Performance of Tubular Type SOFC Using Metallic System Components", Electrotechnical Laboratory, Electrochemical Proceedings vol. 97–40, Jun. 1997, pp. 310–321.

Schiller, G., et al., "Development of Metallic Substrate Supported Thin–Film SOFC by Applying Plasma Spray Techniques", Electrochemical Society Proceedings vol. 99–19, Oct. 1999, pp. 892–903.

Okua, T., et al., "Improvement in Power Stability and Durability Demonstration on New Tubular Type SOFC Using Metallic System Component", vol. 60, No. 5, 1996 pp. 1–9.

Schiller, G., et al., "Development of Plasma Sprayed Components for a New SOFC Designs", Electrochemical Proceedings vol. 97–40, Oct. 1999, pp. 634–645.

Schiller, G. et al., "Development of SOFC Components by Vacuum Plasma Spraying", 1998, pp. 515–518.

Takenoiri, et al., "Development of Metallic Substrate Supported Planar SOFC at Fuji Electric", Fuel Cell Seminar Abstracts, Nov. 1998, pp. 84–87.

Unal, et al., "Microstructures of $Y_2O_3$–Stabilized $ZrO_2$ Electron Beam–Physical Vapor Deposition Coatings on Ni–Base Superalloys", Department of Materials Science and Engineering, vol. 984–92, 1994, pp. 984–992.

Wallin, et al., "Cofired Solid Oxide Fuel Cells for Operation at 800° C.", 1997, Abstract.

Steele, et al., "Fuel Cells" Pub. No.: US 2002/0048699A1, Pub. Date: Apr. 25, 2002, pp. 1–9.

Yao, et al, "Improved preparation procedure and properties for a multilayer piezoelectric thick–film actuator", Sensors and Actuators A 71, pp. 139–143.

Okuo, et al., "Development of Metallic Substrate Tubular SOFC", Electrotechnical Laboratory, Oct. 1994, pp. 908–919.

Derwent abstract for JP–56–2549–A (Jan. 1981).

* cited by examiner

METHOD OF MAKING A LAYERED COMPOSITE ELECTRODE/ELECTROLYTE

CROSS-REFERENCE TO RELATED APPLICATIONS

This application is a divisional of U.S. application Ser. No. 09/626,022, filed Jul. 27, 2000, now U.S. Pat. No. 6,682,842 titled SOLID STATE ELECTROCHEMICAL DEVICE ELECTRODE ADDITIVES, which claims priority from U.S. Provisional Application No. 60/146,767, filed Jul. 31, 1999, titled SURFACE ADDITIVES FOR ENHANCED ELECTRODE PERFORMANCE, the disclosures of which are herein incorporated by reference for all purposes.

This invention was made with government support in the course of or under prime contract No. DE-ACO3-76SF00098 between the U.S. Department of Energy and the University of California. The government has certain rights in this invention.

BACKGROUND OF THE INVENTION

The present invention relates generally to the field of electrochemical devices, and more particularly solid state electrochemical devices composed of one or more electrodes in contact with a solid state electrolyte and/or membrane.

Solid state electrochemical devices are often implemented as cells including two electrodes, the anode and the cathode, and a dense solid electrolyte/membrane which separates the electrodes. In many implementations, such as in fuel cells and oxygen and syn gas generators, the solid membrane is an electrolyte composed of a material capable of conducting ionic species, such as oxygen ions, sodium ions, or hydrogen ions, yet has a low electronic conductivity. In other implementations, such as gas separation devices, the solid membrane is composed of a mixed ionic electronic conducting material ("MIEC"). In each case, the electrolyte/membrane must be gas-tight to the electrochemical reactants. In all of these devices a lower total internal resistance of the cell results in improved performance.

The preparation of solid state electrochemical cells is well known. For example, a typical solid oxide fuel cell is composed of a dense electrolyte membrane of a ceramic oxygen ion conductor, a porous anode layer of a ceramic, a metal or, most commonly, a ceramic-metal composite ("cermet"), in contact with the electrolyte membrane on the fuel side of the cell, and a porous cathode layer of an ionically/electronically-conductive metal oxide on the oxidant side of the cell. Electricity is generated through the electrochemical reaction between a fuel (typically hydrogen produced from reformed methane) and an oxidant (typically air). This net electrochemical reaction involves mass transfer and charge transfer steps that occur at the interface between the ionically-conductive electrolyte membrane, the electronically-conductive electrode and the vapor phase (fuel or oxygen). The contribution of these charge transfer steps, in particular the charge transfer occurring at the oxygen electrode, to the total internal resistance of a solid oxide fuel cell device can be significant.

Electrode structures including a porous layer of electrolyte particles on a dense electrolyte membrane with electrocatalyst material on and within the porous layer of electrolyte are known. As shown in FIG. 1, such electrodes are generally prepared by applying an electrocatalyst precursor-containing electrode material 102 (such as a metal oxide powder having high catalytic activity and high reactivity with the electrolyte) as a slurry to a porous (pre-fired; unsintered; also referred to as "green") electrolyte structure 104, and then co-firing the electrode and electrolyte materials to densify the electrolyte and form a composite electrolyte/electrode/electrocatalyst 106.

Oxides containing transition metals such as Co, Fe, Mn, are known to be useful as oxygen electrodes in electrochemical devices such as fuel cells, sensors, and oxygen separation devices. However, if such compounds were to be used with typical zirconia-based electrolytes, such as YSZ, a deleterious reaction in the temperature range of 1000–1400° C. typically needed to densify zirconia would be expected. The product of this reaction would be a resistive film 105 at the electrode/electrolyte interface, thereby increasing the cell's internal resistance.

Similar problems may be encountered with sintering highly catalytic electrode materials on densified (fired) zirconia-base electrolytes since the sintering temperatures of about 1200° C. to 1400° C. are sufficient to cause the formation of a deleterious resistive film at the electrode/electrolyte interface.

In order to avoid deleterious chemical reactions, attempts have been made to use barrier layers, such as ceria, or to use chemically compatible electrolytes, such as ceria with such transition metal oxides. Also, it has been proposed to add an electrocatalytic precursor to a fired electrode/electrolyte composite, but only for a specific type of electrode material. Specifically, prior researchers have sought to fabricate electrodes with interpenetrating networks of ionically conductive and electronically conductive materials with subsequent infiltration of a catalytic electrode. However, this can hinder the performance of ionic devices, particularly at high current densities where ohmic drop due to current collection can lead to substantial efficiency losses.

It would be desirable to have improved techniques for fabricating high performance solid state electrochemical device oxygen electrodes composed of highly conductive materials.

SUMMARY OF THE INVENTION

The present invention addresses this need by providing an electrode fabricated from highly electronically conductive materials such as metals, metal alloys, or electronically conductive ceramics. In this way, the electronic conductivity of the electrode substrate is maximized. The electrode is combined with an electrolyte to form an electrode/electrolyte structure. The electrode/electrolyte structure of the invention may be prepared by a plurality of methods. An unsintered (possibly bisque fired) moderately catalytic electronically-conductive or homogeneous mixed ionic electronic conductive electrode material may be deposited on a layer composed of a sintered or unsintered ionically-conductive electrolyte material prior to being sintered. In one embodiment, a layer of particulate electrode material is deposited on an unsintered ("green") layer of electrolyte material and the electrode and electrolyte layers are sintered simultaneously, sometimes referred to as "co-firing," under conditions suitable to fully densify the electrolyte while the electrode retains porosity. In another embodiment, the layer of particulate electrode material is deposited on a previously sintered layer of electrolyte, and then sintered. Subsequently, a catalytic material is added to the electrode structure by infiltration of an electrolcatalyst precursor (e.g., a metal salt such as a transition metal nitrate). This may be followed by low temperature firing to convert the precursor to catalyst. The invention allows for an electrode with high electronic conductivity and sufficient catalytic activity to achieve high power density in an ionic (electrochemical) device such as fuel cells and electrolytic gas separation systems.

In one aspect, the present invention provides a method of preparing a layered composite electrode/electrolyte structure. The method involves contacting a mixture of particles of an electronically-conductive or a homogeneous mixed ionically electronically-conductive (MIEC) electrode material with a layer of an ionically-conductive electrolyte material to form an assembly having a layer of the mixture on at least one side of the layer of the electrolyte material. The assembly is sintered to form a porous electrode in contact with a gas-tight electrolyte membrane. The sintered assembly is then infiltrated with a solution or dispersion of a transition metal nitrate-containing electrocatalyst precursor.

In another aspect, the invention provides a method of preparing a layered composite electrode/electrolyte structure. The method involves contacting a mixture of particles of a metal alloy selected from the group consisting of a chromium-containing ferritic steel, a chrome-based alloy and a chrome-containing nickel-based alloy with a layer of an ionically-conductive electrolyte material to form an assembly having a layer of the mixture on at least one side of the layer of the electrolyte material. The assembly is sintered to form a porous electrode in contact with a gas-tight electrolyte membrane. The sintered assembly is then infiltrated with a solution or dispersion of an electrocatalyst precursor.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE INVENTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the present invention provides a technique for the addition of highly reactive elements known to be of value for enhancing catalytic properties of the oxygen electrode to the surface where they are needed, without chemical reactions that occur during firing on of these electrode materials. In this way, moderate performance cathodes that are known to be more chemically stable at the firing temperatures can be used for the electrode's microstructure formation. Then high performance additives can be incorporated into the electrodes without significantly altering the microstructure or creating performance limiting reaction layers.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

For the purposes of this application, an oxygen (or air) electrode refers to the electrode at which oxygen is either reduced, or oxygen anions are oxidized, depending on the function of the cell. Examples of oxygen electrodes are the cathode portion of a solid oxide fuel cell or the anode portion of an electrolytic cell, such as may be used for oxygen generation. The oxygen electrode portion of the electrode/electrolyte structure of this invention comprises a porous, electronically-conductive material, or a (homogeneous) mixed ionic electronic conductor ceramic material having an electrocatalyst dispersed within its pores.

Figure 1:
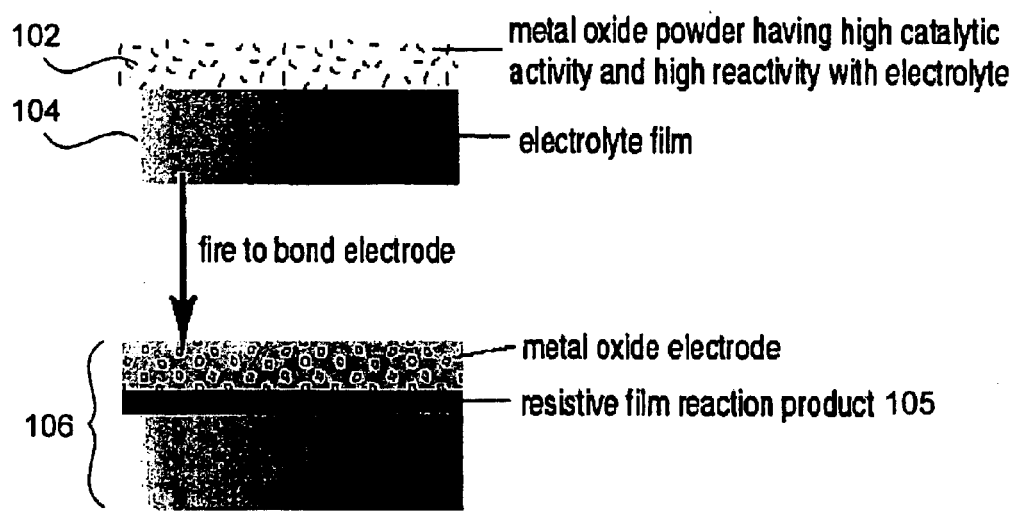
FIG. 1 depicts an undesirable method of forming an electrode/electrolyte composite for a solid sate electrochemical cell.
Figure 2:
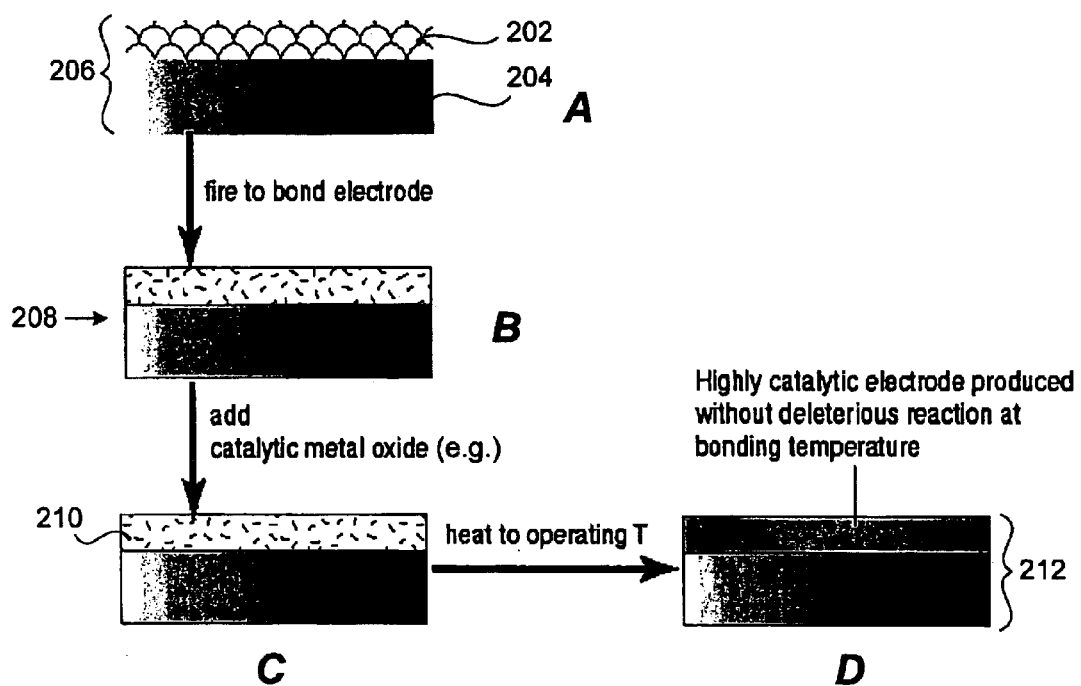
FIG. 2 depicts stages in a method of forming an electrode/electrolyte composite for a solid state electrochemical cell in accordance with one embodiment the present invention.

FIG. 2 show stages in a method of forming an electrode/electrolyte composite for a solid state electrochemical cell in accordance with one embodiment the present invention. Referring to FIG. 2(A), a particulate electrode material 202 is applied as a slurry to a porous green (pre-fired; unsintered) electrolyte structure 204 to form an assembly 206.

The electrode/electrolyte structure of the invention may be prepared by any suitable method. For example, an unsintered (possibly bisque fired) moderately catalytic electronically-conductive or homogeneous mixed ionic electronic conductive electrode material may be deposited on a layer composed of a sintered or unsintered ionically-conductive electrolyte material prior to being sintered. In one embodiment, a layer of particulate electrode material is deposited on an unsintered layer of electrolyte material and the electrode and electrolyte layers are sintered simultaneously, sometimes referred to as "co-firing." In another embodiment, the layer of particulate electrode material is deposited on a previously sintered layer of electrolyte, and then sintered.

The particulate electrode material may be applied to the electrolyte layer (generally composed of particles of an electrolyte material), by any suitable means such as, for example, aerosol spray, dip coating, painting or silk-screening, electrophoretic deposition, vapor deposition, vacuum infiltration, and tape casting.

In general, suitable electrode materials in accordance with the present invention as have an electronic conductivity of at least about $10^{-1}$ Siemens/cm (S/cm) at the operating temperature of the electrochemical device with which the electrode is to be incorporated. Preferably, the conductivity of the material is at least about 100 S/cm, more preferably at least about 1000 S/cm. The electrode material should also be compatible with the electrolyte layer; that is, it should not cause any deleterious reaction with the electrolyte at the processing temperatures to form a new phase with insufficient conductivity or electrocatalytic properties for use in a practical electrochemical device.

Exemplary electronically-conductive materials include metals, such as the transition metals Cr, Fe, Cu, Ag, and metal alloys thereof. Such metal electrode materials are suitable for use in oxygen or hydrogen electrodes for solid state electrochemical devices that are operated at relatively low temperatures, for example, about 400 to 800° C.

Other suitable electrode materials include mixed ionic electronic conductor ceramic materials, such as $La_{1-x}Sr_xMn_yO_{3-\delta}$ ($1 \geq X \geq 0.05$)($0.95 \leq y \leq 1.15$) ("LSM"), $La_{1-x}Sr_xCoO_{3-\delta}$($1 \geq X \geq 0.10$)("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_3$, and $Sm_{0.5}Sr_{0.5}CoO_3$. Preferred LSM materials include $La_{0.8}Sr_{0.2}MnO_{3-\delta}$, $La_{0.65}Sr_{0.35}MnO_{3-\delta}$ and $La_{0.45}Sr_{0.55}MnO_{3-\delta}$. These materials form a homogeneous electrode having both ionic and electronic conductivity.

Low-chromium ferritic steels, such as type 405 and 409 (11–15% Cr), intermediate-chromium ferritic steels, such as type 430 and 434, (16–18% Cr), or high-chromium ferritic steels, such as type 442, 446 and E-Brite (19–30% Cr), chrome based alloys such as Cr5Fe1Y, and chrome-containing nickel-based Inconel alloys including Inconel 600 may also be used.

Suitable electrolyte/membrane materials for use in solid state electrochemical devices are well known in the art. In general, they are ionically-conductive solid membranes having an ionic conductivity of at least about $10^{-3}$ S/cm at the operating temperature of the device and sufficiently low electronic conductivity for use as the electrolyte membrane which separates the anode from the cathode in a solid state electrochemical device. Doped zirconias such as yttria-stabilized zirconia ("YSZ") and scandium-doped zirconia are very commonly used. Preferably, the electrolyte/membrane material is YSZ.

In the case of an electrolytic oxygen separation device, where oxygen is driven across the membrane by applying a potential difference and supplying energy, the membrane may be chosen from electrolytes well known in the art including yttria stabilized zirconia (e.g., $(ZrO_2)_{0.92}(Y_2O_3)_{0.08}$), scandia stabilized zirconia (SSZ), doped ceria such as $(CeO_2)_{0.8}(Gd_2O_3)_{0.2}$ (CGO), doped lanthanum gallate such as $La_{0.8}Sr_{0.2}Ga_{0.85}Mg_{0.15}O_{2.825}$ (LSGM20–15) and doped bismuth oxide such as $(Bi_2O_3)_{0.75}(Y_2O_3)_{0.25}$.

In the case of a gas separation device, where partial pressures, rather than applied potential, are used to move ions across the membrane, the membrane may be a mixed ionic electronic conductor (MIEC), such as $La_{1-x}Sr_xCoO_{3-\delta}$ ($1 \geq X \geq 0.10$)("LSC"), $SrCo_{1-x}Fe_xO_{3-\delta}$($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_3$, and $Sm_{0.5}Sr_{0.5}CoO_3$.

Such electrolyte/membranes are well know to those of skill in the art and may be prepared by any suitable method, such as by depositing a slurry of an ionically-conductive electrolyte material directly onto one of the electrodes, or by preparing a cast tape of an ionically-conductive electrolyte material, which is laminated to a cast tape of electrode material.

The assembly 206 is then fired at a temperature and under conditions suitable to sinter the electrode material, densify the electrolyte (where necessary), and bond the two to form a composite electrolyte/electrode 208, as shown in FIG. 2(B). The sintering conditions should be selected so that they are sufficient to fuse the majority of the electrode particles. If the electrolyte is green, the sintering conditions should be selected to densify the electrolyte material sufficiently to form a gas-tight electrolyte membrane. Suitable sintering conditions for given materials may be readily determined experimentally by those of skill in the art. When sintered, the electrode material forms a porous layer.

As shown in FIG. 2(C), an electrocatalytic precursor is then is incorporated into the porous sintered electrode 210. The electrocatalytic precursor is added by any suitable technique, such as by infiltrating the network with a solution or dispersion of an electrocatalyst precursor and heating the infiltrated network under conditions sufficient to form the corresponding electrocatalyst. The electrocatalyst should have sufficient catalytic activity for the electrochemical reaction(s) occurring at the electrode for its use in a practical device. This material must also be compatible with the electrolyte layer at the operating temperature of the device.

Suitable electrocatalytic precursors in accordance with the present invention include aqueous or non-aqueous solutions of metal salts, such as nitrates, acetates and citrates. For example, this can be accomplished by using nitrate salts of a transition or rare earth metal or combination of transition and/or rare earth metal salts desired for catalytic activity, such as Co nitrate, Fe nitrate, Mn nitrate or, for a hydrogen electrode, Ni nitrate. The porous electrode structure may be infiltrated by any suitable means such as by aerosol spray, dip coating, painting or silk-screening, or vacuum infiltration of the electrocatalyst material into the porous structure. A stack of cells may also be assembled prior to being infiltrated and infiltrated simultaneously.

Following addition of the electrocatalytic precursor, the composite electrode/electrolyte 212 is heated to operating temperature for the electrochemical device of which it is a part, generally about 600 to 900° C., as shown in FIG. 2(D). In this way a highly catalytic electrode in a composite electrode/electrolyte structure may be produced without deleterious reactions between the electrocatalytic precursors and the zirconia of the electrolyte at the electrode/electrolyte bonding production stage. Thus, in one example, an LSM/YSZ structure can be fired at reasonably high temperatures (1350° C.) to yield a moderate performance electrode, and by adding cobalt nitrate by infiltration to this electrode the performance is boosted to what might be expected for cobalt based electrode.

The porosity of the composite electrode structure containing the electrocatalyst is preferably at least about 10 percent, more preferably at least about 20 percent, and generally about 30%. The thickness of the sintered electrolyte membrane is preferably between about 5 and 40 microns, more preferably no greater than about 20 microns. The thickness of the sintered composite electrode is preferably between about 5 and 5000 microns, more preferably no greater than about 2000 microns (a thicker electrode is used where the electrode also provides the mechanical support for an electrochemical device).

Infiltration of a fired electrode with a electrocatalytic precursor solution (e.g., a metal nitrate solution) not only solves the problem of reactivity of the catalytic material with the electrolyte, but also addresses the problem of thermal mismatch. If, for example, a highly catalytic electrode material had a very poor match of the coefficient of thermal expansion with the electrolyte, thermal cycling would typically lead to spallation of the electrode from the electrolyte surface. In the case of the present invention, an electrode material that has a thermal expansion coefficient close to that of the electrolyte may be used. The electrode is therefore well bonded to the electrolyte. In a subsequent step, an electrocatalytic precursor for a highly catalytic material, such as such as a metal oxide, is infiltrated into the bonded electrode thereby improving the electrode performance.

Importantly, this process represents a simple low-cost means of improving electrode performance by allowing the fabrication of a high strength, high conductivity electrode from materials of moderate catalytic activity and then adding that activity in a subsequent step. Furthermore, in the case of expensive catalytic materials, a low cost material can be used to develop the electrode microstructure followed by a small amount of catalytic material introduced by the metal salt technique described herein.

EXAMPLE

The following example illustrates aspects and features of a specific implementation in accordance with the present invention. It should be understood the following is representative only, and that the invention is not limited by the detail set forth in this example.

Figure 3:
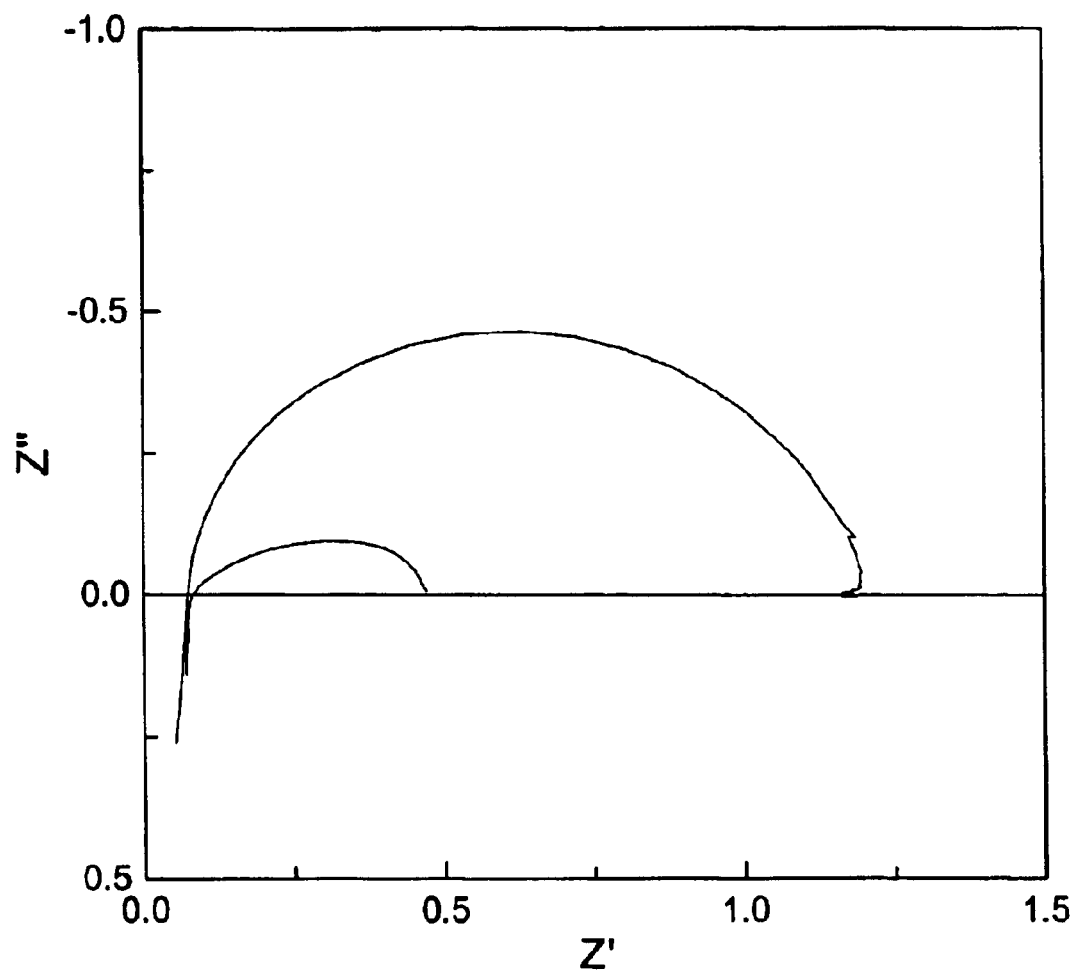
FIG. 3 shows plots of the impedance spectra for an electrode with and without additives in accordance with one embodiment of the present invention.

A 1 cm×1 cm Pt electrode (previously fired to 950° C. to bond Pt to electrolyte) was tested on YSZ electrolyte at 900° C. LSM-YSZ was used as the counter electrode. Then a mixture of Co, Sr, Ce, and Ni nitrates dissolved in distilled water were applied to the Pt electrode and allowed to dry under a heat lamp. The sample was again placed in a furnace and heated. Impedance spectra was taken at 900° C. FIG. 3 shows plots of the impedance spectra for the Pt electrode without additives (large arc) and Pt electrode with surface additives (small arc). The example shows the effect of a bare porous metal electrode, Platinum, with and without the addition of metal nitrate salts. The reduction in the size of the impedance arc for the electrode with the additives shows improvement in performance by lowering cell impedance.

Conclusion

Although the foregoing invention has been described in some detail for purposes of clarity of understanding, those skilled in the art will appreciate that various adaptations and modifications of the just-described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A method of preparing a layered composite electrode/electrolyte structure, comprising:
   contacting a mixture consisting essentially of particles selected from the group consisting of an electronically-conductive electrode material and a homogeneous mixed ionically electronically-conductive (MIEC) electrode material with a layer comprising an ionically-conductive electrolyte material to form an assembly comprising a layer of the mixture on at least one side of the layer of the electrolyte material;
   sintering the assembly to form a porous electrode in contact with a gas-tight electrolyte membrane; and
   infiltrating the sintered assembly with a solution or dispersion of an electrocatalyst precursor, the electrocatalyst precursor comprising at least one transition metal nitrate.

2. The method of claim 1, wherein the electrode material is one of a metal and a metal alloy.

3. The method of claim 1, wherein the electrode material is selected from the group consisting of transition metals Cr, Fe, Cu, Ag and Pt.

4. The method of claim 1, wherein the electrode material is selected from the group consisting of a chromium-containing ferritic steel, a chrome-based alloy and a chrome-containing nickel-based alloy.

5. The method of claim 4, wherein the chrome-based alloy is Cr5Fe1Y.

6. The method of claim 4, wherein the alloy is a chrome-containing nickel-based alloy.

7. The method of claim 1, wherein the electrode material is a MIEC ceramic.

8. The method of claim 7, wherein the MIEC is a ceramic selected from the group consisting of $La_{1-x}Sr_xMn_yO_{3-\delta}$ ($1 \geq X \geq 0.05$)($0.95 \leq y \leq 1.15$), $La_{1-x}Sr_xCoO_{3-\delta}$ ($1 \geq X \geq 0.10$, $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, and $Sm_{0.5}Sr_{0.5}CoO_{3-\delta}$.

9. The method of claim 8, wherein the $La_{1-x}Sr_xMn_yO_{3-\delta}$ is selected from the group consisting of $La_{0.8}Sr_{0.2}MnO_{3-\delta}$, $La_{0.65}Sr_{0.35}MnO_{3-\delta}$ and $La_{0.45}Sr_{0.55}MnO_{3-\delta}$.

10. The method of claim 1, wherein the ionically-conductive electrolyte material is selected from the group consisting of yttria-stabilized zirconia, scandia-stabilized zirconia, doped ceria, doped lanthanum gallate and doped bismuth oxide.

11. The method of claim 10, wherein the ionically conductive electrolyte material comprises yttria-stabilized zirconia.

12. The method of claim 1, wherein the electrode material is $La_{1-x}Sr_xMn_yO_{3-\delta}$ ($1 \geq X \geq 0.05$) ($0.95 \leq y \leq 1.15$) and the electrolyte material is yttria-stabilized zirconia.

13. The method of claim 1, wherein the transition metal salt is at least one of Fe nitrate, Co nitrate, Mn nitrate, Ce nitrate, Sr nitrate, Ni nitrate and Ag nitrate.

14. The method of claim 13, wherein the at least one transition metal nitrate is Co nitrate.

15. The method of claim 1, wherein the electrolyte layer is gas-tight prior to sintering of the assembly and remains gas-tight upon sintering of the assembly.

16. The method of claim 1, wherein the electrolyte layer is gas-permeable prior to sintering of the assembly and becomes gas-tight upon sintering of the assembly.

17. The method of claim 1, wherein said electrode is an oxygen electrode.

18. The method of claim 1, wherein said electrode is a hydrogen electrode.

19. A method of preparing a layered composite electrode/electrolyte structure, comprising:
   contacting a mixture consisting essentially of particles of a metal alloy selected from the group consisting of a chromium-containing ferritic steel, a chrome-based alloy and a chrome-containing nickel-based alloy with a layer comprising an ionically-conductive electrolyte material to form an assembly comprising a layer of the mixture on at least one side of the layer of the electrolyte material;
   sintering the assembly to form a porous electrode in contact with a gas-tight electrolyte membrane; and
   infiltrating the sintered assembly with a solution or dispersion of an electrocatalyst precursor.

20. The method of claim, 19 wherein the alloy is a chrome-based alloy.

21. The method of claim 20, wherein the chrome-based alloy is Cr5Fe1Y.

22. The method of claim 19, wherein the electrolyte membrane is a material selected from the group consisting of scandia stabilized zirconia, doped ceria, doped lanthanum gallate and doped bismuth oxide.

23. The method of claim 19, wherein the electrolyte membrane material comprises yttria-stabilized zirconia.

24. The method of claim 19, wherein the electrocatalyst precursor comprises at least one of a transition metal salt, a rare earth metal salt, and any combination of one or more rare earth salts and transition metal salts.

25. The method of claim 24, wherein the the electrocatalyst precursor comprises at least one transition metal salt selected from the group consisting of Fe nitrate, Co nitrate, Mn nitrate, Ce nitrate, Sr nitrate, Ni nitrate and Ag nitrate.

26. The method of claim 25, wherein the at least one transition metal nitrate is Co nitrate.

27. The method of claim 19, wherein the electrolyte layer is gas-tight prior to sintering of the assembly and remains gas-tight upon sintering of the assembly.

28. The method of claim 19, wherein the electrolyte layer is gas-permeable prior to sintering of the assembly and becomes gas-tight upon sintering of the assembly.

29. The method of claim 19, wherein said electrode is an oxygen electrode.

30. The method of claim 19, wherein said electrode is a hydrogen electrode.

* * * * *